United States Patent [19]
Edwards

[11] 3,728,949
[45] Apr. 24, 1973

[54] GEAR DRIVE FOR A CAMERA AND FILM CARTRIDGE

[75] Inventor: Evan A. Edwards, Pittsford, N.Y.

[73] Assignee: Eastman Kodak Company, Rochester, N.Y.

[22] Filed: July 13, 1971

[21] Appl. No.: 162,283

Related U.S. Application Data

[63] Continuation of Ser. No. 25,957, April 6, 1970, abandoned.

[52] U.S. Cl. ................................................95/31 R
[51] Int. Cl. ............................................G03b 19/04
[58] Field of Search......................95/31 R, 31 CA; 242/71.2, 71.4

[56] References Cited

UNITED STATES PATENTS

| 3,613,541 | 10/1971 | Beach | 95/31 |
| 3,528,356 | 9/1970 | Eagle | 95/31 |

Primary Examiner—Samuel S. Matthews
Assistant Examiner—Michael L. Gellner
Attorney—Robert W. Hampton and D. Peter Hochberg

[57] ABSTRACT

A film cartridge includes supply and take-up chambers, a wall interconnecting the chambers to support film therebetween in a plane, and a gear rotatable about an axis for transporting the film across the film plane from the supply chamber to the take-up chamber. A camera for receiving the cartridge includes a cartridge supporting surface and a drive gear engageable with the gear of a received cartridge to define a pressure angle therebetween. The gear axes define a plane which is offset from a normal to the film plane by an angle equal to the pressure angle of the gears, thereby creating a line of force parallel to the film plane so that any tendency of the cartridge to be unseated from the supporting surface in response to the creation of a force component normal to the film plane is negated.

10 Claims, 4 Drawing Figures

PATENTED APR 24 1973

EVAN A. EDWARDS
INVENTOR.

BY D. Peter Hochberg
Robert W. Hampton
ATTORNEYS

EVAN A. EDWARDS
INVENTOR.

GEAR DRIVE FOR A CAMERA AND FILM CARTRIDGE

CROSS-REFERENCES TO RELATED APPLICATIONS

This is a streamline continuation of Ser. No. 25,957, now abandoned.

Reference is made to commonly assigned copending U.S. Pat. Nos. 3,650,489 and 3,613,541, each entitled "Gear Drive for a Camera and Film Cartridge", filed on even date herewith in the names of Richard J. Bresson and James E. Dierks, and David E. Beach, respectively.

BACKGROUND OF THE INVENTION

1. Field of the Invention

The present invention relates generally to cameras for receiving double cavity film cartridges and the means for transporting film loaded therein. More particularly, the invention relates to a camera for receiving a gear driven film cartridge for effecting the transportation of film loaded in the cartridge.

2. Description of the Prior Art

The film cartridges currently in wide use comprise film supply and take-up chambers connected by a wall member, and are receivable in cameras as a unitary package. Film is transported to the take-up compartment of many cartridges by rotating a core in the take-up compartment to wind film thereon. In many of these cartridges, the core is rotated by a camera drive member which is in axial alignment with the core and which is in endwise engagement therewith. As a result, the camera must be high enough to accommodate the drive member, thus rendering it relatively cumbersome. Moreover, a mechanism must usually be provided to withdraw the camera drive member from the insertion and removal path of the cartridge to permit loading and unloading of the camera.

U.S. Pat. No. 3,296,949, issued Jan. 10, 1967 to W. E. Bounds, discloses a camera having a driving gear and a film magazine having a driven gear integral with a take-up spool. The driving gear of the camera and the driven gear of the magazine are in an adjacent coplanar relationship when engaged, with the axes of the driven gear of the magazine and of the driving gear of the camera lying in a plane which is offset from a normal to the film plane. However, the orientation of the driven and driving gears of the magazine loaded camera is such that, upon engagement of the gears, a rearwardly directed force is created which tends to unseat the magazine and move the film from the focal plane of the camera. There is no suggestion that any countervailing reasons exist for the selection of the chosen angle of offset of the driving and driven gears.

Commonly assigned U.S. Pat. No. 2,172,337, issued Sept. 5, 1939 to J. Mihalyi, discloses a roll film camera with a gear driven double cavity cartridge. The driving and driven gears are offset angularly from the normal to the film plane, but the criteria for selection of the offset is not suggested. Again, by virtue of the direction of such offset, a force is created in response to pressure between the gears tending to displace the film cartridge rearwardly in the camera, necessitating the employment of sufficiently sturdy camera elements to counterbalance the unseating force.

SUMMARY OF THE INVENTION

An object of the present invention is the provision of a film advancing apparatus in a gear-driven, cartridge-loaded camera wherein the gears and cartridge seating elements are so arranged that the tendency of the cartridge to become unseated upon engagement of the driving and driven gears is minimized.

In accordance with a preferred embodiment of the present invention, the housing of a gear-driven film cartridge encloses a rotatable core having a gear at one end. The cartridge gear is engageable by a camera driving gear so that when the cartridge is received in the camera, a plane defined by the axes of the driving and driven gears is offset from the normal to the film plane in such a manner as to minimize the tendency of the force created by pressure between the gears to unseat the film cartridge from a support surface in the camera.

The invention, and its objects and advantages, will become more apparent in the detailed description of the preferred embodiment presented below.

BRIEF DESCRIPTION OF THE DRAWING

In the detailed description of the preferred embodiment of the invention presented below, reference is made to the accompanying drawing, in which.

DETAILED DESCRIPTION OF THE INVENTION

Because cameras and film cartridges are well known, the present description will be directed in particular to camera and cartridge elements forming part of, or cooperating more directly with, apparatus in accordance with the present invention. It is to be understood that camera and cartridge elements not specifically shown or described may take various forms well known to those skilled in the art.

Figure 1:
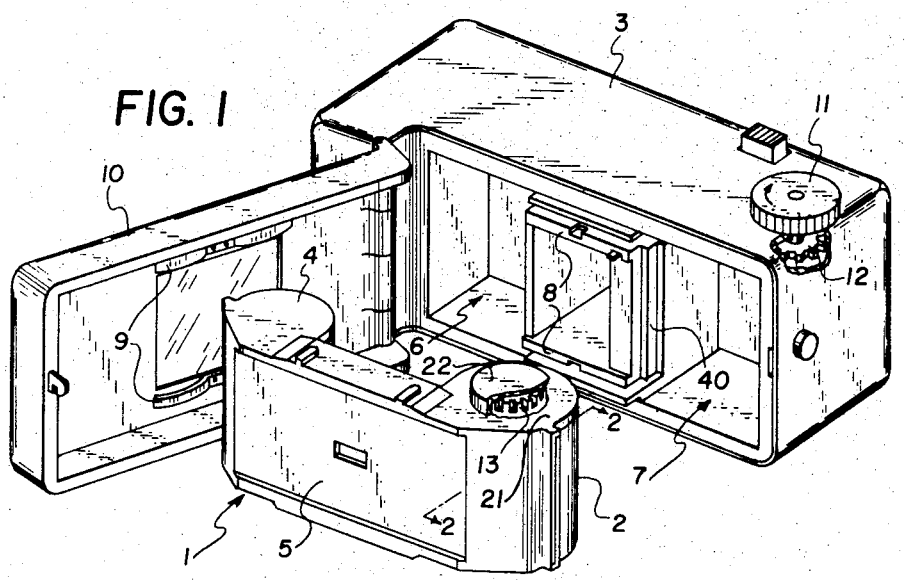
FIG. 1 is a perspective view of a camera according to the invention and a film cartridge for use therein.

A film cartridge 1 is shown in FIG. 1 in position for insertion into a camera 3 and comprises a film supply compartment 4, a wall 5 defining a film plane on the forward face thereof, and a film take-up compartment 2. Camera 3 includes chambers 6 and 7 for receiving the supply and take-up compartments, respectively, of film cartridge 1. Film cartridge 1 is accurately located with respect to the focal plane of the camera objective (not shown) by means of horizontal support members 8, and vertical stepped support members 40, which members engage corresponding structure 41 in cartridge 1 (see FIG. 3). A received cartridge is urged into engagement with members 8 and 40 by leaf springs 9 mounted on the interior of a camera door 10, which is hinged to the rearward part of camera 3 in a conventional manner. The camera film advance mechanism comprises a manually operable knob 11 to which is attached a driving gear 12, gear 12 being engageable with a gear 13 connected to a core in take-up chamber 2, in a manner and for reasons to be described hereinafter.

Figure 2:
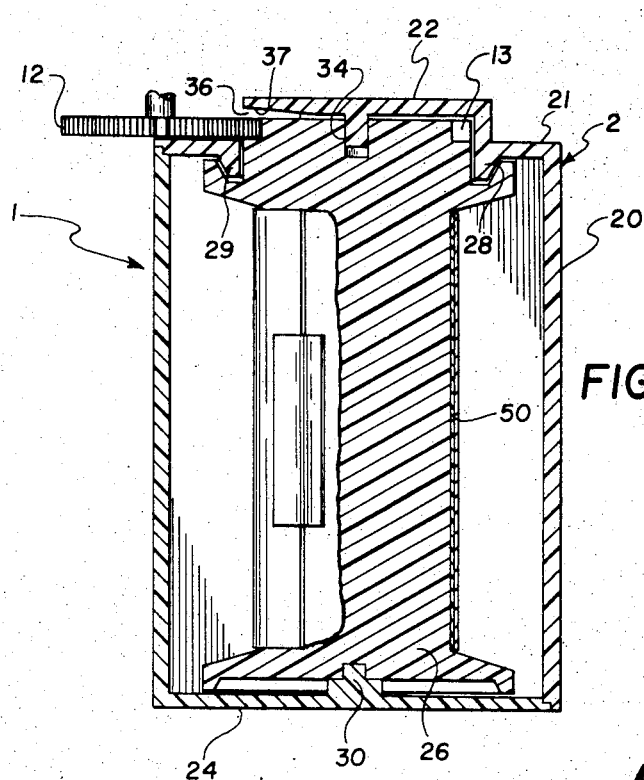
FIG. 2 is a section through line 2—2 in FIG. 1 as it would appear when the cartridge is loaded in the camera, with a camera drive gear shown in engagement with a cartridge gear.

The section through the line 2—2 of FIG. 1, illustrated in FIG. 2, indicates that take-up chamber 2 comprises a cylindrical casing 20, a top wall 21 including a gear cover 22, and a bottom wall 24. Enclosed in take-up chamber 2 is a film core 26 having an annular recess at its upper end in a mating relationship with an inwardly extending annular lip 28 to form a labyrinth light seal at the upper end of chamber 2, and another recess at its lower end by means of which core 26 is journalled on post 30. Integral with the film spool 26 is gear 13 which, when rotated, drives core 26 to wind film 50 from supply chamber 4 onto core 26. Gear cover 22 extends over gear 13 to an extent sufficient to render gear 13 manually inaccessible, and has extending therefrom a post 34 which serves as a bearing for gear 13. The diameter of gear 13 is substantially less than the diameter of take-up chamber 2, and gear cover 22 is only large enough to fulfill its function, thereby maintaining the compactness of the cartridge. Top wall 21 and gear cover 22 define an opening 36 through which driving gear 12 in camera 3 is given access to gear 13 for engagement therewith. The end portion 37 of gear cover 22 is tapered to guide driving gear 12 through opening 36 and into engagement with gear 13. Preferably, compartment 7 of camera 3 is so structured that, upon insertion of film cartridge 2 into camera 3, gears 12 and 13 necessarily become engaged.

For purposes of economy of manufacture, the housing shown consists of only two sections. One section includes part of side wall 20, top wall 21, gear cover 22, guide member 28 and bearing post 34, and the other section includes the remaining part of side wall 20, post 30, and bottom wall 24. These components are preferably made from molded plastic, but other suitable materials and methods will readily occur to those skilled in the art.

Figure 3:
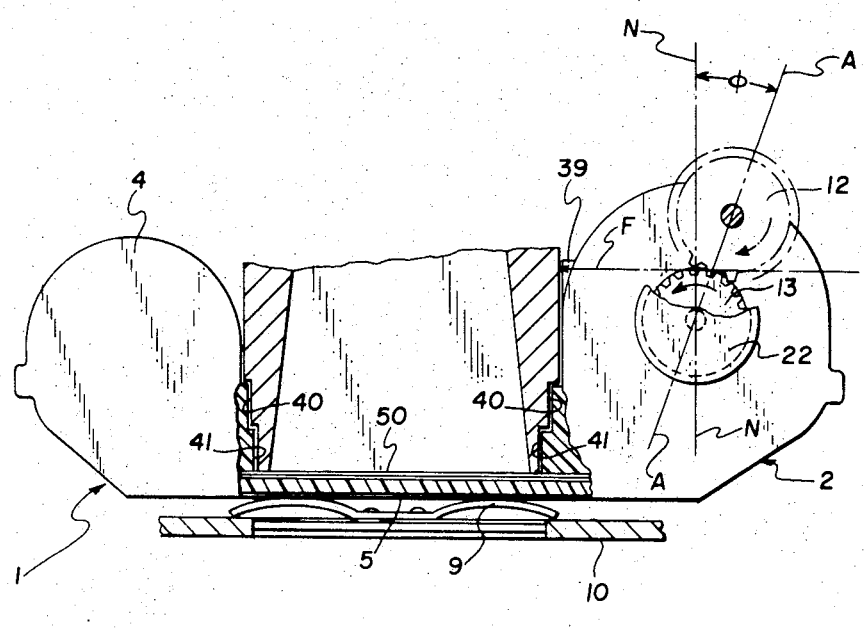
FIG. 3 is a schematic illustration of a top view of a film cartridge loaded in a camera, with portions cut away to expose the gear train.

Referring now to FIG. 3, film cartridge 2 is shown loaded in camera 3 and positioned on support members 40 of the camera. Leaf springs 9 fastened to camera door 10 urge cartridge 2 against camera support members 40. Gear cover 22 of take-up chamber 2 is cut away in FIG. 3 in order to reveal core gear 13 and camera driving gear 12. As indicated by the directional arrow on core gear 13, that gear must be rotated in a counterclockwise direction to wind film on core 26. Accordingly, knob 11 (FIG. 1) must be rotated in a clockwise direction to similarly rotate drive gear 12 to effect the proper displacement of gear 22. Gears 12 and 13 have a pressure angle of 20°, but of course other gear angles could be used. By rotating the plane A—A defined by the axes of rotation of driving gear 12 and core gear 13 from a normal N—N to the film plane by 20°, so that the angle of offset $\Phi$ equals the pressure angle of the gears, the directional force F resulting from the driving engagement of gears 22 and 30 is parallel to the film plane. The absence of a resulting force normal to the film plane negates the necessity of providing means for offsetting such a force in order to prevent the unseating of the film cartridge from support members 40. Film cartridge 2 is contoured by the provision of seating pad 39 on the outer surface of cylindrical casing 20, so that the cartridge contacts one support member 40 in the path of the line of force F, thus obviating the creation of a moment by the force F, and accordingly obviating the need for providing a counterbalancing moment to avoid unseating the film cartridge 2 by such a moment. Of course, if the line of force F passes near the point of contact, a slight moment will be created, which if minimal, is easily counterbalanced by springs 9.

Figure 4:
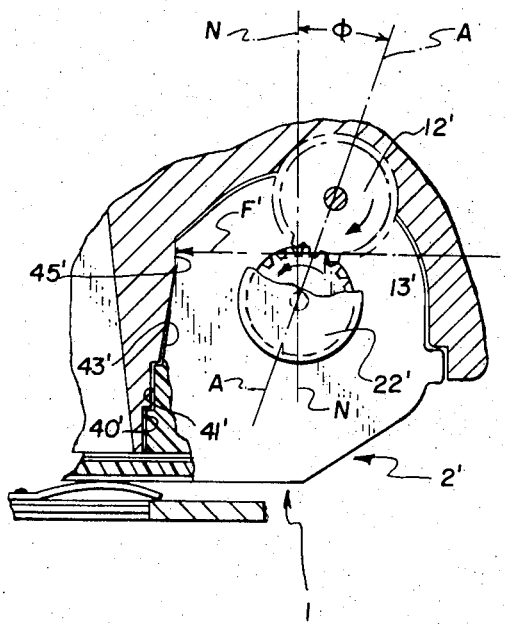
FIG. 4 is a partial top view of a film cartridge loaded in a camera according to an embodiment of the invention.

As an alternative to the contouring of film cartridge 2 to engage the camera along the line of force F as described above, the camera elements defining the chamber for a cartridge take-up compartment can be structured to accomplish the same end. Thus, referring to FIG. 4, a film cartridge 1' includes a take-up compartment 2' having a slightly modified profile from previously described cartridge 1. Take-up compartment 2' has associated therewith a gear 13', a gear cover 22', and support structure 41', which elements correspond in function and structure to the like-numbered elements (without the superscript) previously discussed. The camera in which cartridge 1' is loaded includes a gear 12' which engages gear 13' in such a manner, again referring to the earlier discussion, that the directional force F' is parallel with the film plane. To avoid a moment tending to unseat cartridge 1' from the camera support members, the camera support structure is contoured so that it engages the cartridge on the line of force F'. Hence, camera support members 40' include a slightly tapered portion 43' which need not be in contact with the cartridge, and a section 45' of no taper which is in intimate contact with the similarly shaped housing of cartridge 1' on the line of force F'. This section is sufficiently large to assure the line of force F' will pass through it regardless of slight variation in the manner of engagement of gears 12' and 13'.

It can be seen that each of the objects of the invention has been accomplished. A camera for receiving a gear driven film cartridge including gears selected and located as explained above, has been provided wherein the forces and moments resulting from the engagement of the gears are minimized, so that the mechanism for holding the film cartridge in place in the camera can be lighter, and more compact. Operation of the invention is simple, requiring the mere insertion of the cartridge into the camera and actuation of the camera drive mechanism.

The invention has been described in detail with particular reference to a preferred embodiment thereof, but it will be understood that variations and modifications can be effected within the spirit and scope of the invention.

I claim:

1. A camera for use with a film cartridge of the type having a film take-up compartment, a film supply compartment, means for supporting film in an exposure plane between the compartments and a take-up core located in the take-up compartment and having a cartridge gear connected thereto and rotatable about an axis to transport film along the exposure plane from the supply compartment to the take-up compartment, said camera comprising:

a. means defining a camera focal plane;

b. means for receiving and supporting such a cartridge in a manner such that the exposure plane of a received cartridge is located at said camera focal plane; and c. gear means, mounted for rotation in said camera at a position for engagement with the cartridge gear of a received cartridge, for rotating such received cartridge gear in a manner such that the resultant force vector effective upon such cartridge is in a direction substantially parallel to said camera focal plane.

2. A camera for receiving a film cartridge having (1) a film take-up core and (2) a gear drivingly connected to the core and having an axis of rotation, said camera having a focal plane and comprising:

a drive gear for rotating a received cartridge core gear to wind film on the core, said drive gear (1) having an axis of rotation, (2) being engageable with the core gear of a received cartridge to define a pressure angle, and (3) being oriented relative to the core gear to position the axes of rotation of the gears to define a plane offset from a normal to the focal plane by an angle substantially equal to said pressure angle so that the line of force created in response to pressure between said core gear and said drive gear is substantially parallel to the focal plane; and means for rotating said drive gear.

3. For use with a film cartridge of the type having (1) a casing, (2) a film take-up core in the casing, and (3) a cartridge gear drivingly connected to the core and mounted on the casing for rotation about a first axis; a camera comprising:

a housing;

an optical axis;

means in said housing for defining a focal plane;

a drive gear mounted in said housing for rotation about a second axis; and means for positioning a received cartridge in said housing such that (1) the gear of the cartridge engages said drive gear to define a pressure angle therebetween and (2) the first and second axes define a plane offset from a normal to said focal plane in a direction away from said optical axis by an angle substantially equal to said pressure angle.

4. For use with a film cartridge of the type having (1) spaced film supply and take-up compartments, (2) means for supporting film in an exposure plane between said supply compartment and said take-up compartment, (3) a core rotatably mounted in said take-up compartment, and (4) a cartridge gear drivingly connected to the core for rotation about a first axis; a camera having a focal plane and comprising:

a housing which defines a supply chamber and a take-up chamber for respectively receiving the supply and take-up compartments of such a film cartridge;

means on said housing between said supply and take-up chambers for positioning the exposure plane of a received cartridge at the camera's focal plane; and a drive gear mounted in said housing for rotation about a second axis, said drive gear (1) extending at least partially into said take-up chamber for engaging the gear of a received cartridge to define a pressure angle therebetween and (2) positioned in said housing such that the first and second axes define a plane offset from a normal to focal plane in a direction away from said supply chamber by an angle substantially equal to said pressure angle.

5. For use with a film cartridge of the type having (1) film supply and take-up compartments, (2) means for supporting film in an exposure plane between said supply compartment and said take-up compartment, (3) a core rotatably mounted in said take-up compartment, and (4) a cartridge gear drivingly connected to the core for rotation about a first axis; a camera having a focal plane and comprising:

a housing which defines a supply chamber and a take-up chamber for respectively receiving the supply and take-up compartments of such a film cartridge;

a drive gear mounted in said housing for rotation about a second axis, said drive gear extending at least partially into said take-up chamber for engaging the gear of a received cartridge to define a pressure angle therebetween; and means on said housing for positioning a received cartridge such that (1) the cartridge's exposure plane coincides with said focal plane and (2) the first and second axes define a plane offset from a normal to said focal plane in a direction away from said supply chamber by an angle substantially equal to said pressure angle.

6. In a camera including (1) means for receiving a film cartridge of the type having a take-up compartment, means for supporting film in an exposure plane and a cartridge gear rotatable about an axis for transporting film past the exposure plane onto a roll in the take-up compartment; (2) at least one support member for locating a received cartridge such that the exposure plane of the cartridge occupies a predetermined plane in the camera; and (3) a rotatable drive gear mounted for driving engagement with the gear of such a received cartridge to define a pressure angle therebetween; the improvement wherein said drive gear is located in the camera at a position such that the axis of rotation of said drive gear and the axis of rotation of the gear of a received cartridge define a plane offset from a normal to the exposure plane of such received cartridge by an angle substantially equal to such pressure angle, whereby the line of force created in response to pressure between said drive gear and the gear of a received cartridge is substantially parallel to the exposure plane, and there is substantially no force vector resulting from pressure between said drive gear and the gear of a received cartridge which would tend to move the cartridge away from said support member.

7. In a camera including (1) means for receiving a film cartridge of the type having a take-up compartment, means for supporting film in an exposure plane and a cartridge gear rotatable about an axis for transporting film past the exposure plane onto a roll in the take-up compartment; (2) at least one support member for locating a received cartridge such that the exposure plane of the cartridge occupies a predetermined plane in the camera; and (3) a drive gear mounted for driving engagement with the gear of such a received cartridge to define a pressure angle therewith and rotatable in an angular direction to transport film past the exposure plane of a received cartridge into the take-up compartment; the improvement wherein said drive gear is located in the camera at a position such that the axis of rotation of said drive gear and the axis of rotation of the gear of a received cartridge define a plane offset from a normal to said predetermined plane in said angular direction by an angle substantially equal to such pressure angle, whereby the line of force created in response to pressure between said drive gear and the gear of a received cartridge does not have a substantial vector tending to move such received cartridge away from said support member.

8. In a camera including (1) means for receiving a film cartridge of the type having a film take-up compartment, a film supply compartment, means for supporting film in an exposure plane between the compartments, and a cartridge gear rotatable about an axis for transporting film along the exposure plane from the supply compartment to the take-up compartment; (2) at least one support member for locating a received cartridge such that the exposure plane of the received cartridge occupies a predetermined plane in the camera, and (3) gear means for drivingly engaging the teeth of the gear of the received cartridge to transport film in the cartridge; the improvement comprising means for rotatably mounting said gear means in the camera at a position where:

the axis of rotation of said gear means and the axis of rotation of the gear of a received cartridge define a plane offset from a normal to the exposure plane of such received cartridge; and the pressure between the teeth of said gear means and the teeth of the gear of the received cartridge during film transport creates a resultant force vector in a direction substantially parallel to said predetermined plane in the camera.

9. A camera for use with a film cartridge of the type having a cartridge take-up core and a cartridge gear drivingly coupled to such take-up core and rotatable on an axis of cartridge gear rotation, said camera comprising:

means defining a camera focal plane;

means for receiving and locating such a cartridge in a predetermined position in said camera;

camera gear means for drivingly engaging the cartridge gear of a received cartridge in a manner defining a pressure angle between said camera gear means and such cartridge gear; and means on said camera for rotatably mounting said camera gear means at a position where the force vector, created during film advance by interaction of the cartridge gear of such a received cartridge and said camera gear means, will be substantially parallel to said focal plane.

10. A camera for use with a film cartridge of the type having a cartridge take-up core and a cartridge gear drivingly coupled to such take-up core and rotatable on an axis of cartridge gear rotation, said camera comprising:

means defining a camera focal plane;

means for receiving and locating such a cartridge in operative position in said camera;

a camera gear rotatably mounted in said camera on an axis of camera gear rotation and constructed for engaging the cartridge gear of an operatively positioned cartridge in a manner defining a pressure angle between said camera gear and such cartridge gear; and means on said camera for rotating said camera gear to effect the advance of film in an operatively positioned cartridge, said camera gear being located in said camera for cooperation with such operatively positioned cartridge gear in a manner such that the axes of rotation of said camera gear and of such cartridge gear define a plane offset from a normal to said camera focal plane by an angle substantially equal to said pressure angle, whereby the force vector, created during film advance by interaction of the cartridge gear of such an operatively positioned cartridge and said camera gear, will be substantially parallel to said focal plane.

* * * * *